United States Patent
Lee et al.

(10) Patent No.: US 9,651,934 B2
(45) Date of Patent: May 16, 2017

(54) JOINT GUARANTEE SYSTEM FOR VEHICLE ASSEMBLY AND CONTROL METHOD OF THE SAME

(71) Applicant: Hyundai Motor Company, Seoul (KR)

(72) Inventors: Jaehyun Lee, Seoul (KR); Sung Phil Ryu, Seoul (KR)

(73) Assignee: Hyundai Motor Company, Seoul (KR)

( * ) Notice: Subject to any disclaimer, the term of this patent is extended or adjusted under 35 U.S.C. 154(b) by 703 days.

(21) Appl. No.: 14/133,461

(22) Filed: Dec. 18, 2013

(65) Prior Publication Data
US 2015/0045929 A1    Feb. 12, 2015

(30) Foreign Application Priority Data
Aug. 12, 2013 (KR) .................. 10-2013-0095513

(51) Int. Cl.
*B23K 26/02* (2014.01)
*B23K 26/08* (2014.01)
(Continued)

(52) U.S. Cl.
CPC ............ *G05B 19/402* (2013.01); *B23P 19/06* (2013.01); *B23P 21/00* (2013.01); *B23P 2700/50* (2013.01);
(Continued)

(58) Field of Classification Search
CPC ...... H01F 41/02; H01F 7/0278; H01F 7/0284; H01L 27/0266; Y10T 29/53091;
(Continued)

(56) References Cited

U.S. PATENT DOCUMENTS 6,531,675 B2 * 3/2003 Faitel .................... B23K 26/02
219/121.63
7,185,410 B2 * 3/2007 Lawson .................. B23P 19/04
29/221.5
(Continued)

FOREIGN PATENT DOCUMENTS

JP          3212993 B2     7/2001
JP      2006-293762 A    10/2006
(Continued)

OTHER PUBLICATIONS

Shi et al., Flexible robotic assembly in dynamic environments, Sep. 2010, 6 pages.*
(Continued)

*Primary Examiner* — Thuy Dao
(74) *Attorney, Agent, or Firm* — Morgan Lewis & Bockius LLP (57) ABSTRACT

A fastening guarantee system for vehicle assembly is used in a vehicle assembly line for assembling a fastening object to a vehicle body conveyed on a conveyer line with fastening members. The system may include i) a vehicle body sensing unit that senses a vehicle body entering the conveyer line and the distance to the vehicle body, ii) a plurality of tool sensing units at predetermined intervals along the conveyer line that senses the position of a fastening tool, iii) an inertia sensor module that senses the angle and the displacement of the fastening tool, iv) a tool controller, and v) the fastening tool.

17 Claims, 6 Drawing Sheets

(51) Int. Cl.
*G02B 5/08* (2006.01)
*G05B 19/402* (2006.01)
*B23P 21/00* (2006.01)
*B23P 19/06* (2006.01)

(52) U.S. Cl.
CPC .............. *G05B 2219/2609* (2013.01); *G05B 2219/49202* (2013.01)

(58) Field of Classification Search
CPC .. G05B 19/402; B23K 26/0838; B25J 9/1697; B60R 1/12; B60R 1/1207
See application file for complete search history.

(56) References Cited

U.S. PATENT DOCUMENTS

| | | | | |
|---|---|---|---|---|
| 9,333,654 | B2 * | 5/2016 | Chen | ................ B25J 9/1697 |
| 2006/0167587 | A1 * | 7/2006 | Read | .................. B23Q 9/00 |
| | | | | 700/245 |
| 2008/0126424 | A1 | 5/2008 | Koishi et al. | |
| 2008/0235970 | A1 * | 10/2008 | Crampton | .............. B25J 13/088 |
| | | | | 33/503 |
| 2014/0165360 | A1 * | 6/2014 | Mangiarino | ......... B62D 65/028 |
| | | | | 29/407.1 |

FOREIGN PATENT DOCUMENTS

| | | |
|---|---|---|
| JP | 2010-191769 A | 9/2010 |
| JP | 5182168 B2 | 9/2010 |
| KR | 10-2004-0040767 A | 5/2004 |
| KR | 10-0842088 B1 | 6/2008 |
| KR | 10-2013-0001955 A | 1/2013 |

OTHER PUBLICATIONS

Pawlewski et al., Just in sequence delivery improvement based on Flexsim simulation experiment, Dec. 2012, 12 pages.*

* cited by examiner

JOINT GUARANTEE SYSTEM FOR VEHICLE ASSEMBLY AND CONTROL METHOD OF THE SAME

CROSS-REFERENCE TO RELATED APPLICATION

The present application claims priority of Korean Patent Application Number 10-2013-0095513 filed Aug. 12, 2013, the entire contents of which application is incorporated herein for all purposes by this reference.

BACKGROUND OF INVENTION

Field of Invention

The present invention relates to a vehicle assembly system. More particularly, the present invention relates to a fastening guarantee system for vehicle assembly that can manage fastening history of parts of a vehicle in an assembly line where the parts are assembled to a vehicle body, and a control method of the same.

Description of Related Art

In general, vehicle makers assemble tens of thousands of parts through a large number of welding and assembly processes in all of mass production processes to produce vehicles.

In particular, most of the works made in a designing process of the processes of producing a finished vehicle are fastening processes of fastening various parts to a vehicle body, using coupling members such as bolts and nuts.

The fastening processes are connected directly with the quality index of the vehicle such as durability or the degree of comfort of the finished vehicle, which the consumers feel, so it is required to thoroughly manage the history of the parts for the vehicle body.

However, although the importance of managing the fastening history of parts for a vehicle body is recognized in the art, management of fastening history with high practical effect has not been made due to technical limitations.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a fastening guarantee system for vehicle assembly having advantages of being able to very effectively manage fastening history by precisely recognizing the positions of a vehicle body and fastening tools in an assembly line of vehicles, and a control method of the system.

Various aspects of the present invention provide for a fastening guarantee system for vehicle assembly, which is used in a vehicle assembly line for assembling a fastening object to a vehicle body conveyed on a conveyer line with fastening members and may include i) a vehicle body sensing unit that is disposed on the assembly line, senses a vehicle body entering the conveyer line, and senses the distance to the vehicle body by radiating and receiving a laser at entry and exit sides of the conveyer line, ii) a plurality of tool sensing units that is disposed at predetermined intervals along the conveyer line in the assembly line and senses the position of the fastening tool, iii) an inertia sensor module that is disposed on the fastening tool and senses the angle and the displacement of the fastening tool at fastening points for the vehicle body and the fastening object, iv) a tool controller that supplies control signals, which correspond to the fastening points for the vehicle body and the fastening object, the types of fastening members, and fastening torque of the fastening tool, to the fastening tool, and v) the fastening tool, and the angle and displacement of the fastening tool through the vehicle body sensing unit, the tool sensing unit, and the inertia sensor module, sets the fastening points, for the vehicle body and the fastening object, the types of the fastening members, and the fastening torque of the fastening tool, transmits the set values to the tool controller, and receives and stores an identification number of the vehicle body, the types of the fastening members, and the fastening torque resultant value of the fastening tool from the tool controller.

The vehicle body sensing unit may include barcode scanner disposed at the vehicle entry side of the conveyer lien and recognizing a barcode on the vehicle body and a laser sensor disposed at the vehicle body entry and exit sides of the conveyer line, radiating a laser to the vehicle body, receiving the laser reflecting from the vehicle body, and sensing the distance to the vehicle body.

The barcode scanner may generate an identification number of the vehicle body entering the conveyer line, generate order information of the vehicle body, using the identification number, and transmit the order information of the vehicle body to the main controller.

The main controller may obtain the identification number of the vehicle body between the entry and exit sides of the conveyer line.

The main controller may extract the outline of the vehicle body in response to a sensing signal from the laser sensor and calculate the position of the vehicle body between the entry and exit sides of the conveyer line by analyzing the outline.

The main controller may calculate the position of a vehicle body between the entry and exit sides on the basis of the gap between vehicle bodies conveyed on the conveyer line and the positions of the vehicles at the entry and exit sides of the conveyer line.

An RFID tag periodically transmitting a signal in the range of Ultra Wide Band (UWB) may be attached to the fastening tool.

The tool sensing unit may include an RFID sensor that calculates the position of the fastening tool in real time in response to the signal from the RFID tag.

The inertia sensor module may sense the angle, the acceleration, and the angular velocity of the fastening tool.

The main controller may recognize a vehicle body close to the fastening tool as a fastening object, on the basis of the real-time position information of a vehicle body obtained by the vehicle body sensing unit and the real-time position information of a fastening tool obtained by the tool sensing unit.

The main controller may determine the types of fastening members on the basis of the angle of the fastening tool obtained by the inertia sensor module and sets fastening torque of the fastening tool.

The main controller may set fastening points for a vehicle body and a fastening object on the basis of the displacement of a fastening tool obtained by the inertia sensor module.

When there are several fastening points for the vehicle body and the fastening object, the main controller may determine a fastening pattern of the fastening tool at the fastening points on the basis of the displacement of the fastening tool obtained from the inertia sensor module.

Various aspects of the present invention provide for a method of controlling a fastening guarantee system for vehicle assembly, which may include providing (a) the fastening guarantee system for vehicle assembly which includes a vehicle body sensing unit, a tool sensing unit, an inertia sensor module, a tool controller, and a main controller, (b) generating an identification number of a vehicle body by sensing a vehicle body entering a conveyer line with the vehicle sensing unit, and generating order information of vehicle bodies from the identification numbers, (c) obtaining the position information of a vehicle at the entry and exit sides of the conveyer line, by extracting and analyzing the outline of the vehicle body in response to a sensing signal from the vehicle body sensing unit, (d) obtaining the position information of a vehicle between the entry and exit sides on the basis of the predetermined gaps between vehicle bodies conveyed along the conveyer line and of the position of the vehicle body at the entry and exit sides of the conveyer line, (e) sensing the position of a fastening tool on the conveyer line through the tool sensing unit and sensing the displacement and angle of the fastening tool through the inertia sensor module, (f) recognizing the vehicle body close to a fastening tool on the basis of the position information of a vehicle body obtained by the vehicle body sensing unit and the position information of the fastening tool obtained by the tool sensing unit, (g) obtaining the position information of the vehicle body and the fastening too and the angle and the displacement of the fastening tool, setting fastening points for the vehicle body and the fastening object, the types of fastening members, and the fastening torque of the fastening tool, and transmitting the set values to the tool controller, (h) fastening the fastening members to the fastening points for the vehicle body and the fastening object by supplying a fastening signal to the fastening tool through the tool controller, and (i) receiving and storing the identification number of the vehicle body, the types of the fastening members, and the fastening torque result of the fastening tool from the tool controller.

The identification number of the vehicle between the entry and exit sides of the conveyer line may be obtained by the vehicle body sensing unit.

When there are several fastening points for the vehicle body and the fastening object, a fastening pattern of the fastening tool at the fastening points is determined on the basis of the displacement of the fastening tool obtained by the inertia sensor module.

The movement distance of the fastening tool may be calculated by double integrating the acceleration of the fastening tool obtained by the inertia sensor module.

The movement path of the fastening tool may be estimated by integrating the acceleration of the fastening tool obtained by the inertia sensor module.

The identification number of the vehicle body, the types of the fastening members, and the fastening resultant value of the fastening tool are transmitted to a following repair process.

Whether there is poor fastening of the fastening members at the fastening points may be determined in the following repair process.

According to various aspects of the present invention, it is possible to achieve fastening history management with a high practical effect by precisely recognizing the positions of a vehicle body and a fastening tool, using a vehicle body sensing unit, a tool sensing unit, and an inertia sensor module.

Further, accurate fastening result and fastening history management may be achieved, even if a worker works in an arbitrary order, not following the predetermined work order, or works out of a predetermined work position.

Further, according to various aspects of the present invention, it is possible to range of the fastening object from a vehicle into a fastening member and contribute to improving the quality of fastening by accurately matching the fastening result with the fastening object.

Further, according to various aspects of the present invention, it is possible to save investment cost by simplifying the system and increase work convenience by more increasing the range of fastening.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The unrelated parts to the description of the illustrated embodiments are not shown to make the description clear and like reference numerals designate like element throughout the specification.

Further, the sizes and thicknesses of the configurations shown in the drawings are provided selectively for the convenience of description, so that the present invention is not limited to those shown in the drawings and the thicknesses are exaggerated to make some parts and regions clear.

Discriminating the names of components with the first, the second, etc. in the following description is for discriminating them for the same relationship of the components and the components are not limited to the order in the following description.

Throughout the specification, unless explicitly described to the contrary, the word "comprise" and variations such as "comprises" or "comprising", will be understood to imply the inclusion of stated elements but not the exclusion of any other elements.

Further, the terms, " . . . unit", " . . . mechanism", " . . . portion", " . . . member" etc. used herein mean the unit of inclusive components performing at least one or more functions or operations.

Figure 1:
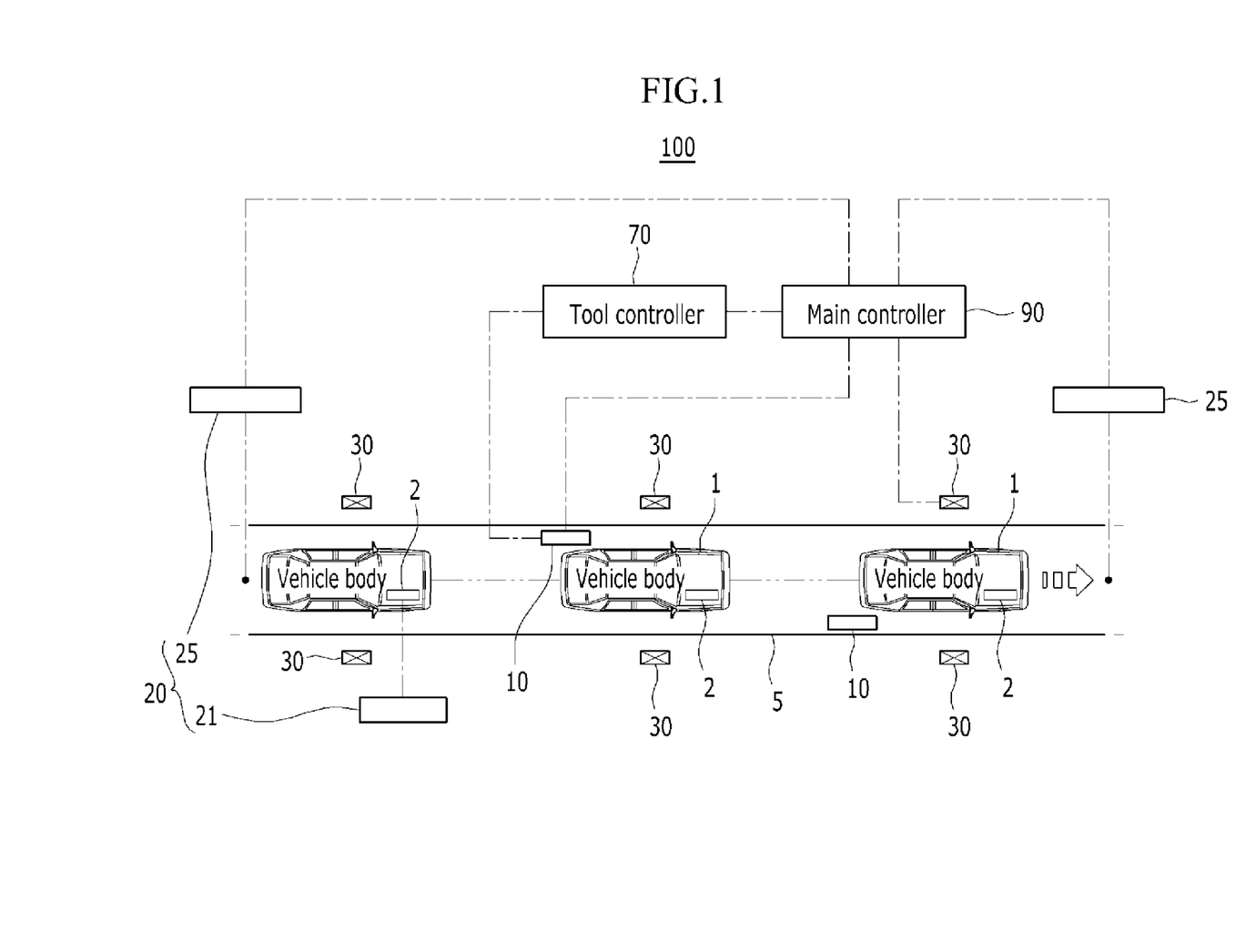
FIG. 1 is a plan schematic diagram of an exemplary fastening guarantee system for vehicle assembly according to the present invention.
Figure 2:
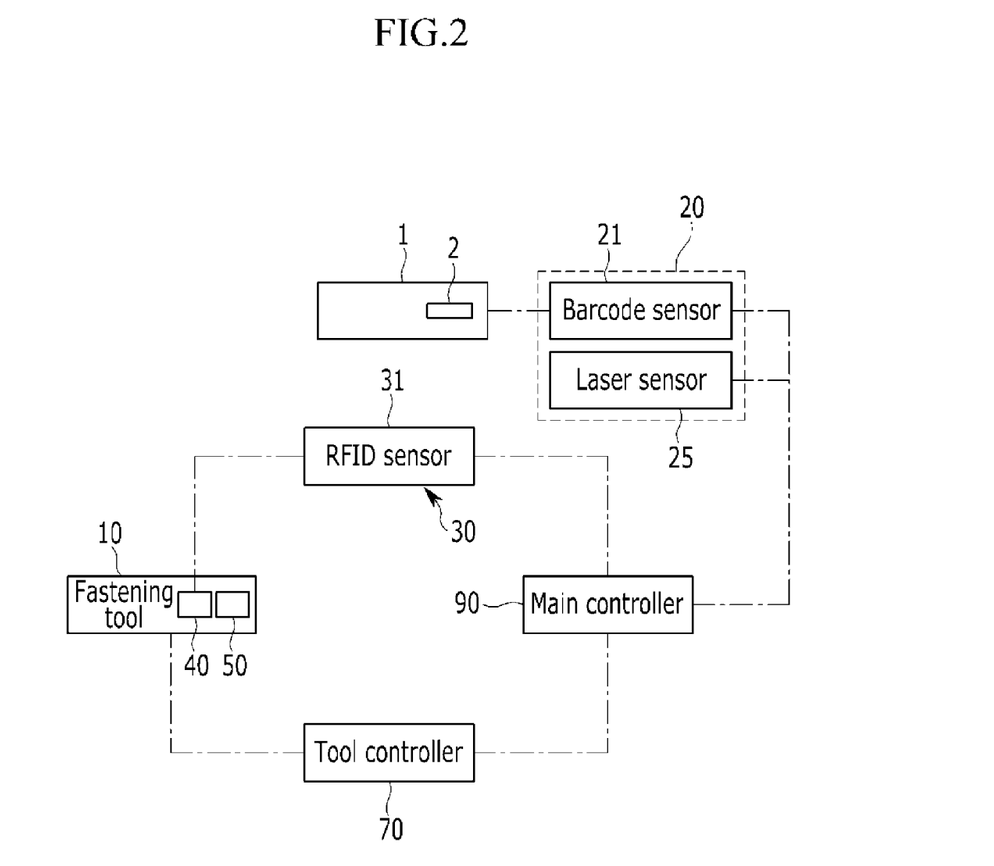
FIG. 2 is a schematic block diagram of an exemplary fastening guarantee system for vehicle assembly according to the present invention.

FIG. 1 is a plan schematic diagram of a fastening guarantee system for vehicle assembly according to various embodiments of the present invention and FIG. 2 is a schematic block diagram of the fastening guarantee system for vehicle assembly according to various embodiments of the present invention.

Referring to FIGS. 1 and 2, a fastening guarantee system 100 for vehicle assembly according to various embodiments of the present invention can be used for a vehicle assembly system in a vehicle production process for fastening/assembling predetermined parts (hereinafter, referred to as "fastening object") to vehicle bodies 1 conveyed at regular intervals with fastening members.

For example, various embodiments of the present invention can be used for a vehicle assembly line for fastening/assembling a fastening object 3 (see FIG. 3), which is a designing part such as a brake pedal, to a vehicle body 1 with coupling members including bolts and nuts in a design process of a process of producing a finished vehicle.

The fastening guarantee system 100 according to various embodiments of the present invention is provided for locating in real time all of the vehicle bodies 1 and fastening tools 10 in a corresponding process (e.g. a design process) and for managing the fastening history of the fastening object 3 to the vehicle body 1, using the locating result.

The vehicle bodies 1 are conveyed at regular intervals on a conveyer line 5 and the conveyer line 5 may include a conveyer belt well known in the art.

Figure 3:
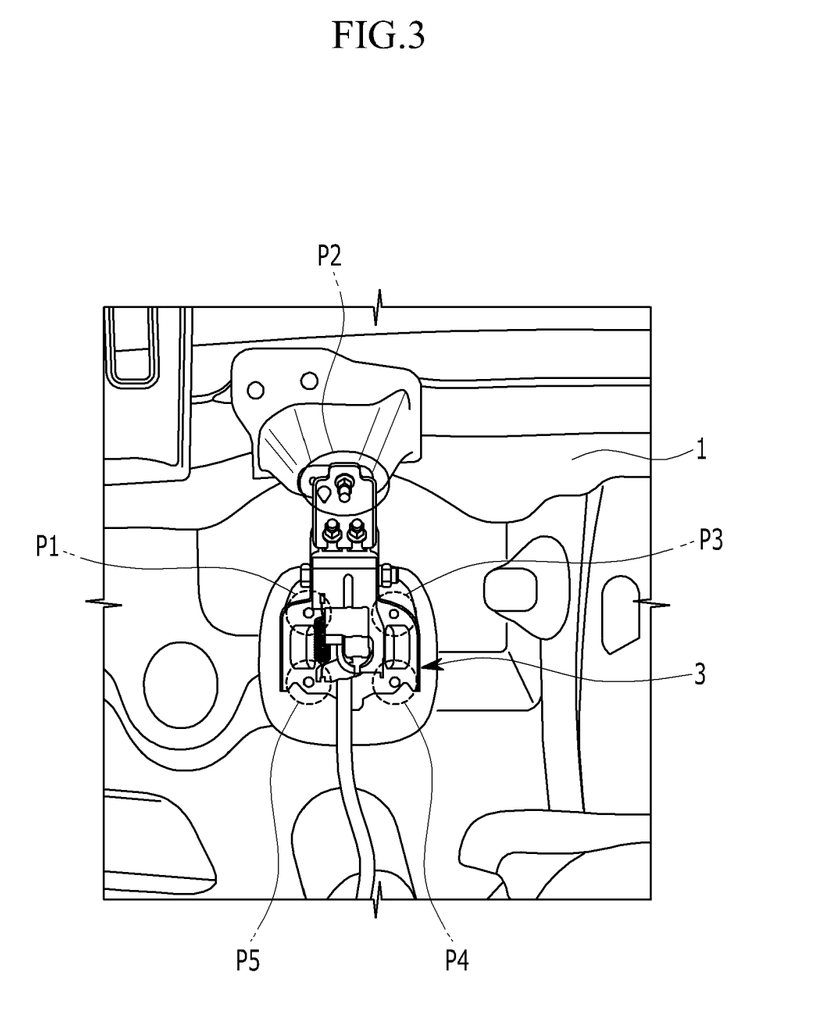
FIG. 3 is a block diagram schematically showing an example of a fastening object, using an exemplary fastening guarantee system for vehicle assembly according to the present invention.

As in FIG. 3, a plurality of (for example, five) fastening points P1~P5 that require different fastening angles and fastening levels is provided at the fastening portion on the vehicle body 1 where the fastening object 3 is fastened.

In this case, the first fastening point P1 in the fastening points P1~P5 for the vehicle body 1 and the fastening object 3 requires a fastening angle of 23 degrees and a fastening level of predetermined kgf and the other fastening points P2~P5 require a fastening angle of 90 degrees and a fastening level of predetermined kgf.

On the other hand, the fastening tool 10 used in various embodiments of the present invention is an electric fastening device that fastens coupling members such as bolts and nuts to the vehicle body 1 and the fastening points P1~P5 of the fastening object 3, using electricity, and can assemble the fastening object 3 to the vehicle body 1 by fastening coupling members to the fastening points P1~P5 with different fastening forces.

Figure 4:
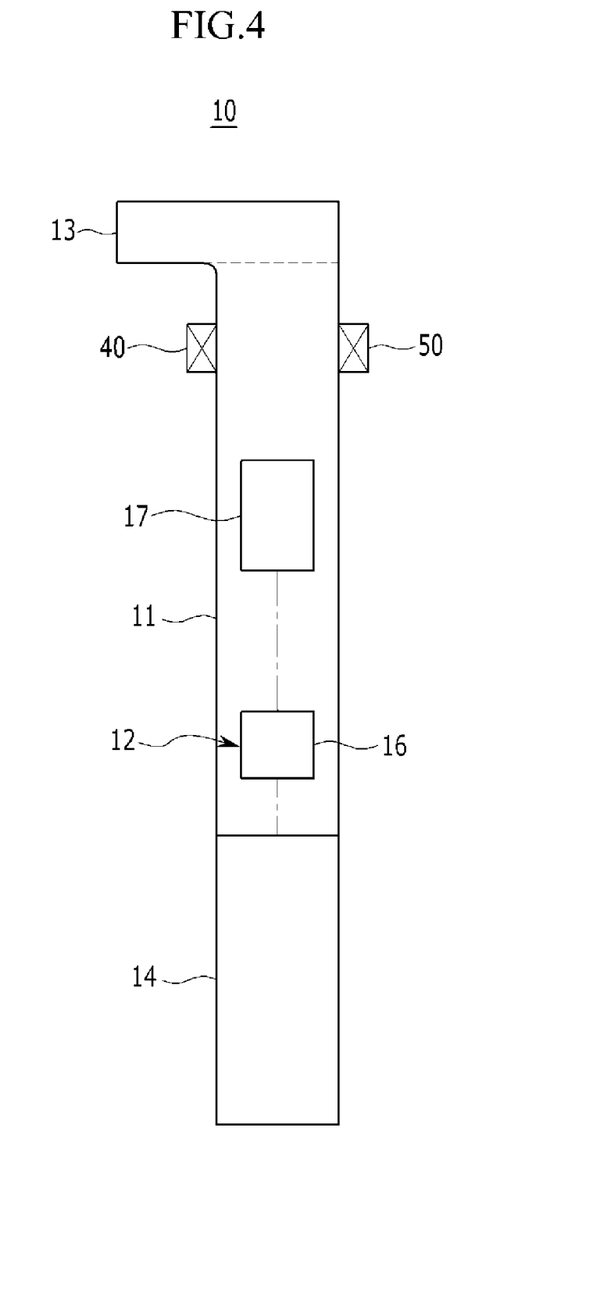
FIG. 4 is a view schematically showing a fastening tool that is used for an exemplary fastening guarantee system for vehicle assembly according to the present invention.
Figure 5:
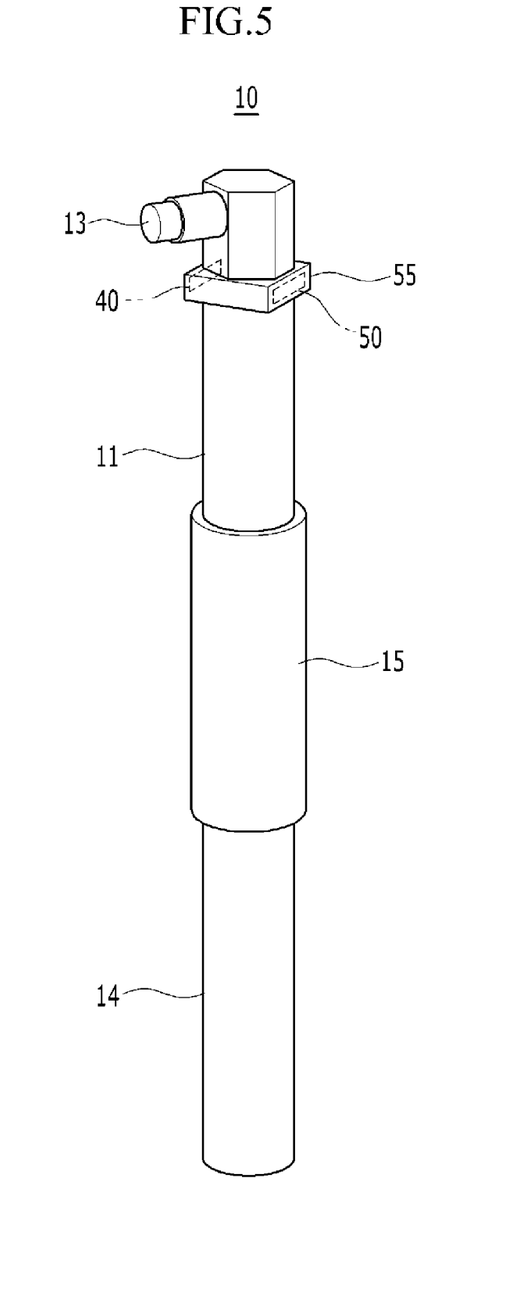
FIG. 5 is a perspective view showing the fastening tool that is used for an exemplary fastening guarantee system for vehicle assembly according to the present invention.

A plurality of fastening tools 10 may be disposed at predetermined positions on the entire conveyer line 5. The fastening tool 10, as shown in FIGS. 4 and 5, includes a tool body 11 and a driving unit 12.

The tool body 11 is the body of an electronic fastening device and predetermined constituent elements may be mounted on the tool body 11. The tool body 11 may have accessories such as various collars, brackets, and support blocks for supporting the constituent elements.

However, since the accessories are provided for supporting various constituent elements, the accessories are generally referred to as the tool body 11, except for exceptional cases.

The tool body 11 is a cylindrical body and the driving unit 12 may be disposed therein. A fastening portion 13 that fastens coupling members (not shown in the figures) such as bolts and/or nuts to the fastening positions P1~P5 for the vehicle body 1 and the fastening object 3 is provided at the end of one side (upper end in the figures) of the tool body 11.

The fastening portion 12 includes a socket (not shown in the figures) supporting a fastening member and the socket may be rotatable by the driving unit 12.

A power connection portion 14 for applying power to the driving unit 12 is disposed at the other end (lower end in the figures) of the tool body 11. The power connection portion 14 may be connected in the type of a male and female connector to the other end of the tool body 11.

Further, a grip 15 for worker to hold the tool is disposed at the substantially middle portion of the tool body 11. The grip 15 may be made of rubber or plastic.

The driving unit 12 is for providing fastening power (torque) to the fastening portion 13, may be connected electrically with the power connection portion 14 and mechanically with the fastening portion 13, and may be disposed in the tool body 11.

The driving unit 12 includes a motor 16 generating torque in response to an electric signal and a power transmission unit 17 transmitting the torque from the motor 16 to the fastening portion 13.

The power transmission unit 17, for example, may be a bevel driving gear and a bevel pinion gear (not shown in the figures) connecting the motor 16 and the fastening portion 13 and may include other gear systems that transmit the torque from the motor 16 to a predetermined rotary body.

The power transmission unit 17 is a power transmission unit well known in the art, so the configuration is not described in detail herein.

The fastening guarantee system 100 for vehicle assembly according to various embodiments of the present invention which can be used in a design process for fastening the fastening object 3 to the vehicle body 1, using the convey structure of the vehicle body 1 and the fastening tool 10, is configured to be able to manage fastening history with a high practical use by precisely recognizing the positions of the vehicle body 1 and the fastening tool 10.

To this end, the fastening guarantee system 100 for vehicle assembly according to various embodiments of the present invention, as shown in FIGS. 1 and 2, basically includes a vehicle body sensing unit 20, a tool sensing unit 30, an inertia sensing module 50, a tool controller 70, and a main controller 90.

The vehicle body sensing unit 20, which senses the vehicle body 1 entering the conveyer line 5 in the vehicle assembly line, may be disposed on the assembly line.

The vehicle sensing unit 20 senses the vehicle body 1 entering the conveyer line 5 and senses the distance to the vehicle body 1 by sending/receiving a laser at the inlet or the outlet of the conveyer line 5.

The vehicle body sensing unit 20 includes a barcode scanner 21 and a laser sensor 25. The barcode scanner 21 is provided for checking the identification number of the vehicle body 1 by recognizing a barcode 2 on the vehicle body 1.

The barcode scanner 21 can generate an identification number for the vehicle body 1 by scanning the barcode 2 on the vehicle body 1 entering the conveyer line 5, generate the order information of the vehicle bodies, using the identification numbers, and transmit the order information corresponding to the identification numbers of the vehicle bodies 1 to the main controller 90.

That is, the barcode scanner 21 can sequentially generate order information of the vehicle body 1 while moving the previously checked identification number by one earlier process every time it checks the identification number of the vehicle body 1 by recognizing the barcode 2 on the vehicle body 1.

As described above, the identification numbers and the order information of the vehicle bodies 1 which are generated by the barcode scanner 21 can be used for the main controller 90 to calculate the position of the vehicle bodies 1 on the conveyer line 5.

That is, the main controller 90 can receive the identification number and the order information of the vehicle body 1 from the barcode scanner 21 and can obtain the identification number of the vehicle body 1 between the entry process of the vehicle body 1 entering the conveyer line 5 and the exit process of the vehicle body 1 exiting from the conveyer line 5.

The barcode scanner 21 is a barcode reader well known in the art, so the configuration is not described in detail herein.

On the other hand, the laser sensor 25 may be installed by specific brackets (not shown in the figures) at the vehicle entry and exit sides of the conveyer line 5. The laser sensor 25 can sense the distance to the vehicle body 1 by radiating a laser to the vehicle body 1 and receiving the laser reflecting from the vehicle body 1.

The laser sensor 25 may be a laser distance sensor that calculates the distance to the vehicle body 1 on the basis of the time from radiation of a laser to the vehicle body 1 at the entry and exit sides of the conveyer line 5 to return of the laser reflecting from the vehicle body 1.

The laser sensor 25 measures the distance to the vehicle body 1 while vertically scanning the vehicle body 1 over 50 times per second and outputs the measurement value to the main controller 90. Then, the main controller 90 extracts the outline of the vehicle body 1 in response to a sensing signal from the laser sensor 25 and can calculate the position of the vehicle body at the entry and exit sides of the conveyer line 5 on the basis of a specific point by analyzing the outline.

Further, since the gaps between the vehicle bodies 1 conveyed on the conveyer line 5 keep constant, the main controller 90 can calculate the position of the vehicle body between the entry and exit sides on the basis of the positions of the vehicle body at the entry and exit sides of the conveyer line 5 which are obtained through the laser sensor 25.

The laser sensor 25 is a laser sensor for sensing a position known in the art, so the configuration is not described in detail herein.

The tool sensing unit 30, which senses the position of the fastening tools 10 on the conveyer line 5 and outputs the sensing signals (sensing values) to the main controller 90, includes RFID sensors 31 disposed at predetermined intervals along the conveyer line 5 in the assembly line.

In various embodiments of the present invention, an RFID tag 40 that periodically sends out signals in the range of UWB (Ultra Wide Band) is disposed in the fastening tools 10 in order to sense the positions of the fastening tools 10 through the RFID sensors 31. The RFID tag 40 is disposed on the tool body 11 of the fastening tool 10, as in FIGS. 4 and 5, and may be disposed on the fastening portion 13 of the tool body 11 through a mounting bracket 55.

A plurality of RFID sensors 31 is disposed at predetermined intervals in the assembly line along the conveyer line 5. In this case, at least three RFID sensors 31 receive the signals from the RFID tags 40 and the signals can be used for calculating the precise positions of the fastening tools 10.

The RFID sensor 31 calculates the position of the fastening tool 10 in real time by receiving the signal in the ultra wide band from the RFID tag 40 on the fastening tool 10. That is, the RFID sensor 31 is used to check which vehicle body 1 the fastening tool 10 is positioned on, on the conveyer line 5, at a specific point of time by receiving the signal from the RFID tag 40.

The RFID (Radio-Frequency Identification) technology of the RFID sensors 31 and the RFID tags 40 means a technology of recognizing information at a closer range, using radio waves.

The RFID tag 40 is composed of an antenna and an integrated circuit, in which information is recorded in the integrated circuit and the information is transmitted to a reader through the antenna. The information is used to identify an object with a tag. The sensing technology of the RFID sensor 31 using the RFID tag 40 uses radio waves instead of using light for reading. Therefore, the RFID sensor 31 can read the RFID sensor 31 even in the distance and can receive information even through objects therebetween.

The inertia sensor module 50 is provided for sensing the displacement of the fastening tool 10 on the conveyer line 5, and the angle and the displacement of the fastening tool to the fastening points P1~P5 for the vehicle body 1 and the fastening object 3.

The inertia sensor module 50 is disposed on the tool body 11 of the fastening tool 10, as in FIGS. 4 and 5. For example, the inertia sensor module 50, which senses the angle, the acceleration, and the angular velocity of the fastening tool 10, may be disposed at the fastening portion 13 of the tool body 11 through the mounting bracket 55.

The inertia sensor module 50 is composed of an angle sensor, an acceleration sensor, and an angular velocity sensor, outputs the information of the angle, the acceleration, and the angular velocity of the fastening tool 10 to the main controller 90, and is used for calculating the precise position of the fastening tool 10 through the main controller 90.

The acceleration sensor and the angular velocity sensor sense the acceleration and the angular velocity to the displacement of the fastening tool 10 in real time, when the fastening tool 10 moves with the conveyer line 5 or a worker moves with the fastening tool 10.

The angular sensor senses the angle of the fastening tool 10 fixed (placed) at the fastening points P1~P5 for the vehicle body 1 and the fastening object 3. The angle sensor may include an optical lever type angle sensor and a polarization type angle sensor which measure the inclination of a predetermined object.

Since the acceleration sensor, the angular velocity sensor, and the angle sensor are an acceleration sensor, an angular velocity sensor, and an angle sensor which are well known in the art, their configurations are not described in detail herein.

The tool controller 70 transmits the defaults for the works of the fastening tool 10 at the fastening points P1~P5 for the vehicle body 1 and the fastening object 3, which are set by the main controller 90 on the basis of the position information of the vehicle body 1 and the position information of the fastening tool 10 which are checked in real time by the vehicle body sensing unit 20, the tool sensing unit 30, and the inertia sensor module 50, to the fastening tool 10.

That is, the tool controller 70 sends control signals corresponding to the fastening points P1~P5 for the vehicle body 1 and the vehicle object 3 set by the main controller 90, the types of fastening members, and the fastening torque of the fastening tool 10 to the fastening tool 10.

The tool controller 70 can receives the defaults for the works of the fastening tool 10 through real-time communication with the main controller 90 and correct in real time the defaults for the works of the fastening tool 10 on the basis of the received defaults.

The main controller 90 is provided for controlling the entire operation of the fastening guarantee system 100 according to various embodiments of the present invention.

The main controller 90 obtains the position information of the vehicle body 1 and the fastening tool 10, and the angle and the displacement of the fastening tool 10 from the vehicle body sensing unit 20, the tool sensing unit 30, and the inertia sensor module 50, sets the fastening points P1~P5 for the vehicle body 1 and the fastening object 3, the types of fastening members, and the fastening torque of the fastening tool 10, and then transmits the set values to the tool controller 70.

When the vehicle body 1 and the fastening object 3 are fastened at the fastening points P1~P5 with the fastening members by the fastening tool 10 receiving control signals corresponding to the set values from the tool controller 70, the main controller 90 receives a fastening completion signal from the tool controller 70.

Further, the main controller 90 receives and stores the identification number of the vehicle body 1, the types of the fastening members, and the fastening torque resultant value of the fastening tool 10 from the tool controller 70 while receiving the fastening completion signal.

The main controller 90 can receive the identification number and the order information of the vehicle body 1 from the barcode scanner 21 of the vehicle body sensing unit 20 and can obtain the identification number of the vehicle body 1 between the entry process of the vehicle body 1 entering the conveyer line 5 and the exit process of the vehicle body 1 exiting from the conveyer line 5.

Further, the main controller 90 can calculate the positions of the vehicle body at the entry and exit sides of the conveyer line 5 by extracting the outline of the vehicle body 1 in response to a sensing signal from the laser sensor 5 of the vehicle body sensing unit 20 and then analyzing the outline.

Further, since the gaps between the vehicle bodies 1 conveyed on the conveyer line 5 keep constant, the main controller 90 can calculate the position of the vehicle body between the entry and exit sides on the basis of the positions of the vehicle body at the entry and exit sides of the conveyer line 5 which are obtained through the laser sensor 25.

Accordingly, the main controller 90 according to various embodiments of the present invention can recognize the vehicle body 1 close to the fastening tool 10 as a fastening object on the basis of the real-time position information of the vehicle body 1 obtained by the vehicle body sensing unit 20 and the real-time position information of the fastening tool 10 obtained by the tool sensing unit 30.

Further, the main controller 90 can determine the types of the fastening members and set the fastening torque of the fastening tool 10 on the basis of the angle value of the fastening tool 10 obtained by the inertia sensor module 50.

Further, the main controller 90 can set the fastening points P1~P5 for the vehicle body 1 and the fastening object 3 on the basis of the displacement of the fastening tool 10 obtained by the inertia sensor module 50.

On the other hand, when there are several fastening points P1~P5 for the vehicle body 1 and the fastening object 3, as in various embodiments of the present invention, the main controller 90 can set a fastening pattern of the fastening tool 10 at the fastening points P1~P5 on the basis of the displacement of the fastening tool 10 obtained by the inertia sensor module 50.

That is, since there are several fastening points P1~P5 for the vehicle body 1 and the fastening object 3, the main controller 90 analyzes the fastening pattern of the fastening tool 10 to accurately discriminate the fastening points P1~P5.

In this case, the tool pattern analysis of the main controller 90 can be achieved by calculating the movement distance of the fastening tool 10 through double integration of the acceleration of the fastening tool 10 obtained by the inertia sensor module 50, and by estimating the movement path of the fastening tool 10 through integration of the acceleration of the fastening tool obtained by the inertia sensor module 50.

Further, the main controller 90 can transmit the identification number of the vehicle body 1, the types of fastening members, and the fastening resultant value of the fastening tool 10, which are received from the tool controller 70, to a following repair process.

In the repair process, whether there is poor fastening of the vehicle body 1 and the fastening tool 3 at the fastening points can be determined and an alarm saying the fastening points P1~P5 with poor fastening can be outputted.

A control method of the fastening guarantee system 100 for vehicle assembly according to various embodiments of the present invention which has the configuration described above is described hereafter in detail with the drawings stated above and the accompanying drawings.

Figure 6:
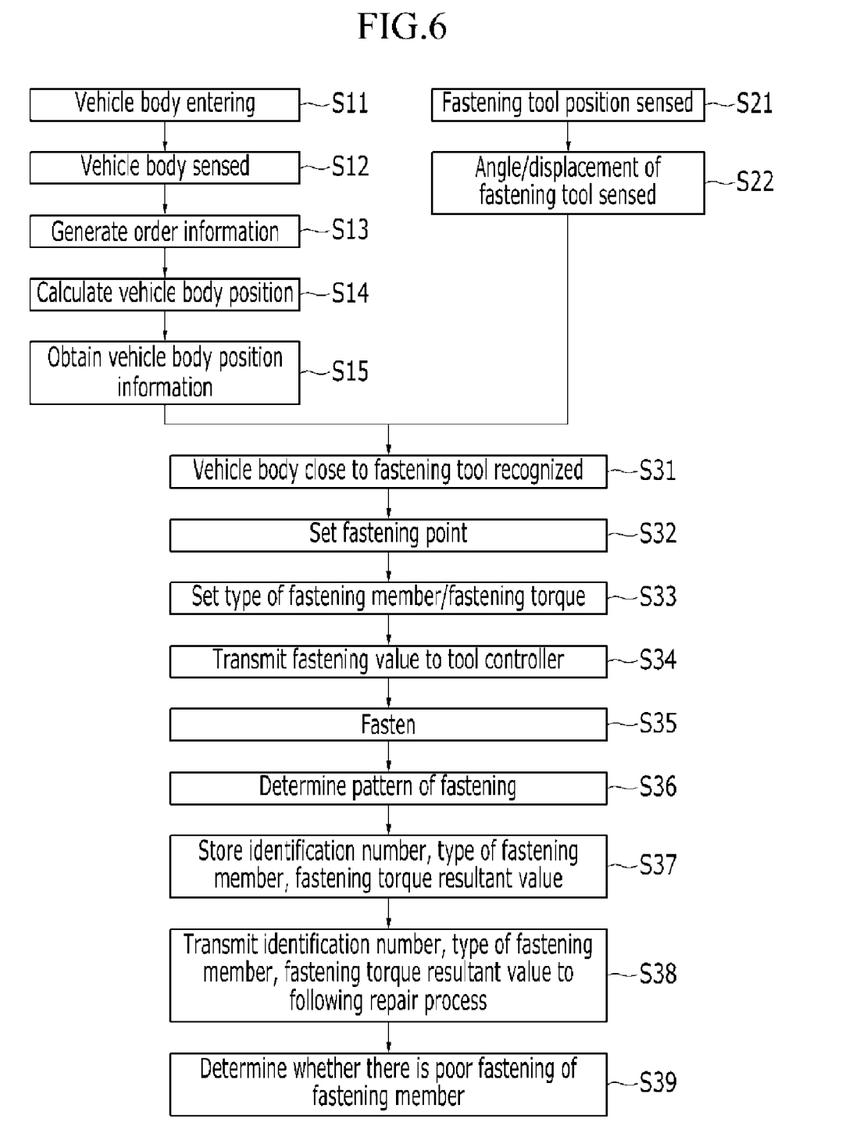
FIG. 6 is a flowchart illustrating a control method of an exemplary fastening guarantee system for vehicle assembly according to the present invention.

FIG. 6 is a flowchart illustrating a control method of the fastening guarantee system for vehicle assembly according to various embodiments of the present invention.

Referring to the figures stated above and FIG. 6, first, as the vehicle body 1 enters the conveyer line 5 in a vehicle assembly line in various embodiments of the present invention (S11), the barcode scanner 21 of the vehicle body sensing unit 20 senses the vehicle body 1 entering the conveyer line 5, at the vehicle entry side of the conveyer line 5 (S12).

The barcode scanner 21 generates an identification number for the vehicle body 1 by scanning the barcode 2 on the vehicle body 1 and generates order information of the vehicle body 1, using the identification number (S13).

That is, the barcode scanner 21 can sequentially generate order information of the vehicle body 1 while moving the previously checked identification number by one process every time it checks the identification number of the vehicle body 1 by recognizing the barcode 2 on the vehicle body 1.

The barcode scanner 21 transmits the identification number and the order information of the vehicle body 1 to the main controller 90. Accordingly, the main controller 90 can receive the identification number and the order information of the vehicle body 1 from the barcode scanner 21 and can obtain the identification number of the vehicle body 1 between the entry process of the vehicle body 1 entering the conveyer line 5 and the exit process of the vehicle body 3 exiting from the conveyer line 5.

In this process, the laser sensor 25 of the vehicle body sensing unit 20 in various embodiments of the present invention radiates a laser to the vehicle body 1 at the vehicle body entry and exit sides of the conveyer line 5 and calculates the distance (position) to (of) the vehicle body 1 from the time when the radiated laser returns after reflecting from the vehicle body 1 (S14).

In this case, the laser sensor 25 measures the distance to the vehicle body 1 while vertically scanning the vehicle body 1 over 50 times per second and outputs the measurement value to the main controller 90.

Then, the main controller 90 extracts the outline of the vehicle body 1 in response to a sense signal from the laser sensor 25 and can obtain the position information of the vehicle body at the entry and exit sides of the conveyer line 5 on the basis of a specific point by analyzing the outline.

Further, since the gaps between the vehicle bodies 1 conveyed on the conveyer line 5 keep constant, the main controller 90 can obtain the position information of the vehicle body between the entry and exit sides on the basis of the positions of the vehicle body at the entry and exit sides of the conveyer line 5 which are obtained through the laser sensor 25 (S15).

Through the process, the RFID sensors 31 of the tool sensing units 30 sense the positions of the fastening tools 10 on the conveyer line 5 in various embodiments of the present invention (S21).

In this case, the RFID sensors 31 calculate the position of the fastening tool 10 in real time in response to signals within a Ultra Wide Band (UWB) periodically transmitted from the RFID tags 40 on the fastening tools 10, and transmit the position values to the main controller 90.

Further, in various embodiments of the present invention, the inertia sensing module 50 on the fastening tool 10 senses the angle and the displacement of the fastening tool 10 and outputs sensing signals to the main controller 90 (S22).

The inertia sensor module 50 outputs the information on the angle, acceleration, and angular velocity of the fastening tool 10 to the main controller 90 through the angle sensor, the acceleration sensor, and the angular velocity sensor. Then, the main controller 90 receives the displacement of the fastening tool 10 from the inertial sensor module 50 and calculates the precise position of the fastening tool 10.

Further, the main controller 90 recognizes the vehicle body 1 close to the fastening tool 10 on the basis of the real-time position information of the vehicle body 1 obtained from the vehicle body sensing unit 20 and the real-time position information of the fastening tool 10 obtained from the tool sensing unit 30 (S31).

Thereafter, when a worker puts the fastening tools 10 at the fastening points P1~P5 for the vehicle body 1 and the fastening object 3 to work, the main controller 90 sets the fastening points P1~P5 for the vehicle body 1 and the fastening tool 3 on the basis of the displacement (information on the angular velocity and acceleration) of the fastening tool 10 obtained by the inertia sensor module 50 (S32).

Further, the main controller 90 determines whether the angle of the fastening tool 10 received from the inertial sensor module 50 is maintained for 0.5 seconds or more. When the angle of the fastening tool 10 is maintained for 0.5 seconds or more, the main controller 90 determines that the fastening tools 10 has been placed at the fastening points P1~P5 for the vehicle body 1 and the fastening object 3.

Further, the main controller 90 determines the types of the fastening members on the basis of the angle value of the fastening tool 10 received from the inertia sensor module 50, and sets the fastening torque of the fastening tool 10 which fits the types (S33).

Accordingly, the main controller 90 obtains the position information of the vehicle body 1 and the fastening tool 10 and the angle and the displacement of the fastening tool 10, sets the fastening points P1~P5 for the vehicle body 1 and the fastening object 3, the types of the fastening members, and the fastening torque of the fastening tool 10, and transmits the set values to the tool controller 70 (S34).

Then, the tool controller 70 sends control signals corresponding to the fastening points P1~P5 for the vehicle body 1 and the vehicle object 3 set by the main controller 90, the types of fastening members, and the fastening torque of the fastening tool 10 to the fastening tool 10.

Accordingly, in various embodiments of the present invention, as a fastening start signal is supplied to the fastening tool 10 through the tool controller 70, the fastening tool 10 can fasten the fastening members with the set fastening torque to the predetermined fastening points P1~P5 for the vehicle body 1 and the fastening object 3.

In various embodiments, when there are several fastening points P1~P5 for the vehicle body 1 and the fastening object 3, the main controller 90 determines a fastening pattern of the fastening tool 10 at the fastening points P1~P5 on the basis of the displacement (information on the angular velocity and acceleration) of the fastening tool 10 obtained by the inertia sensor module 50 (S36).

The main controller 90 can determine the fastening patter of the fastening tool 10 to the fastening points P1~P5 by calculating the movement distance of the fastening tool 10 through double integration of the acceleration of the fastening tool 10 obtained by the inertia sensor module 50, and by estimating the movement path of the fastening tool 10 through integration of the acceleration of the fastening tool 10 obtained by the inertia sensor module 50.

When the fastening members are fastened to the fastening points P1~P5 for the vehicle body 1 and the fastening object 3 by the fastening tool 10, the tool controller 70 transmits a fastening completion signal to the main controller 90.

Then, the main controller 90 receives and stores the identification number of the vehicle body 1, the types of the fastening members, and the fastening torque resultant value of the fastening tool 10 from the tool controller 70 (S37).

In various embodiments of the present invention, the main controller 90 transmits the identification number of the vehicle body 1, the types of the fastening members, and the fastening resultant value of the fastening tool 10, which are received from the tool controller 70, to the following repair process (S38).

Then, in the following repair process, whether there is poor fastening of the fastening tools at the fastening points for the vehicle body 1 and the fastening tool 3 can be determined (S39) and an alarm saying the fastening points P1~P5 with poor fastening can be outputted.

As described above, the fastening guarantee system 100 for vehicle assembly according to various embodiments of the present invention can achieve fastening history management with a high practical effect by precisely recognizing the positions of the vehicle body 1 and the fastening tool 10 by means of the vehicle body sensing unit 20, the tool sensing unit 30, and the inertia sensor module 50.

Further, in various embodiments of the present invention, accurate fastening history management of the fastening result and the fastening object can be achieved, even if a worker works in an arbitrary order, not following the predetermined work order, or works out of a predetermined work position.

Further, in various embodiments of the present invention, it is possible to range of the fastening object from a vehicle into a fastening member and contribute to improving the quality of fastening by accurately matching the fastening result with the fastening object.

Further, in various embodiments of the present invention, it is possible to save investment cost by simplifying the system and increase work convenience by more increasing the range of fastening.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fastening history guarantee system for a vehicle assembly line which assembles a fastening object to a vehicle body conveyed on a conveyer line with fastening members, the system comprising:
    a vehicle body sensing unit disposed on the assembly line sensing a vehicle body entering the conveyer line, and sensing the distance to the vehicle body by radiating and receiving a laser at entry and exit sides of the conveyer line;
    a plurality of tool sensing units disposed at predetermined intervals along the conveyer line and sensing the position of a fastening tool;
    an inertia sensor module disposed on the fastening tool and senses the angle and the displacement of the fastening tool at fastening points for the vehicle body and the fastening object;
    a tool controller that supplies control signals corresponding to the fastening points and the fastening object, the types of fastening members, and fastening torque of the fastening tool; and
    a main controller that obtains the position information of the vehicle body and the fastening tool, and the angle and displacement of the fastening tool through the vehicle body sensing unit, the tool sensing unit, and the inertia sensor module, wherein the main controller sets the fastening points, the types of the fastening members, and the fastening torque of the fastening tool, transmits the set values to the tool controller, and receives and stores an identification number of the vehicle body, the types of the fastening members, and the fastening torque resultant value of the fastening tool from the tool controller,
    wherein the vehicle body sensing unit includes:
    a barcode scanner disposed at the vehicle entry side of the conveyer lien and recognizing a barcode on the vehicle body and
    a laser sensor disposed at the vehicle body entry and exit sides of the conveyer line, radiating a laser to the vehicle body, receiving the laser reflecting from the vehicle body, and sensing the distance to the vehicle body.

2. The system of claim 1, wherein the barcode scanner generates an identification number of the vehicle body entering the conveyer line, generates order information of the vehicle body, using the identification number, and transmits the order information of the vehicle body to the main controller.

3. The system of claim 2, wherein the main controller obtains the identification number of the vehicle body between the entry and exit sides of the conveyer line.

4. The system of claim 1, wherein the main controller extracts the outline of the vehicle body in response to a sensing signal from the laser sensor and calculates the position of the vehicle body between the entry and exit sides of the conveyer line by analyzing the outline.

5. The system of claim 4, wherein the main controller calculates the position of a vehicle body between the entry and exit sides on the basis of the gap between vehicle bodies conveyed on the conveyer line and the positions of the vehicles at the entry and exit sides of the conveyer line.

6. The system of claim 1, wherein an RFID tag periodically transmitting a signal in the range of UWB (Ultra Wide Band) is attached to the fastening tool.

7. The system of claim 6, wherein the tool sensing unit includes an RFID sensor that calculates the position of the fastening tool in real time in response to the signal from the RFID tag.

8. The system of claim 1, wherein the inertia sensor module senses the angle, the acceleration, and the angular velocity of the fastening tool.

9. The system of claim 1, wherein the main controller recognizes a vehicle body close to the fastening tool as a fastening object, on the basis of the real-time position information of a vehicle body obtained by the vehicle body sensing unit and the real-time position information of a fastening tool obtained by the tool sensing unit.

10. The system of claim 1, wherein the main controller determines the types of fastening members on the basis of the angle of the fastening tool obtained by the inertia sensor module and sets fastening torque of the fastening tool.

11. The system of claim 1, wherein the main controller sets fastening points for a vehicle body and a fastening object on the basis of the displacement of a fastening tool obtained by the inertia sensor module.

12. The system of claim 1, wherein the main controller when there are several fastening points for the vehicle body and the fastening object, determines a fastening pattern of the fastening tool at the fastening points on the basis of the displacement of the fastening tool obtained from the inertia sensor module.

13. A method of controlling a fastening history guarantee system for a vehicle assembly system, the method comprising:
    providing the fastening guarantee system for vehicle assembly of claim 1;
    generating an identification number of a vehicle body by sensing a vehicle body entering a conveyer line with the vehicle sensing unit, and generating order information of vehicle bodies from the identification numbers;
    obtaining the position information of a vehicle at the entry and exit sides of the conveyer line, by extracting and analyzing the outline of the vehicle body in response to a sensing signal from the vehicle body sensing unit;
    obtaining the position information of a vehicle between the entry and exit sides on the basis of the predetermined gaps between vehicle bodies conveyed along the conveyer line and of the position of the vehicle body at the entry and exit sides of the conveyer line;

sensing the position of a fastening tool on the conveyer line through the tool sensing unit and sensing the displacement and angle of the fastening tool through the inertia sensor module;

recognizing the vehicle body close to a fastening tool on the basis of the position information of a vehicle body obtained by the vehicle body sensing unit and the position information of the fastening tool obtained by the tool sensing unit;

obtaining the position information of the vehicle body and the fastening too and the angle and the displacement of the fastening tool, setting fastening points for the vehicle body and the fastening object, the types of fastening members, and the fastening torque of the fastening tool, and transmitting the set values to the tool controller;

fastening the fastening members to the fastening points for the vehicle body and the fastening object by supplying a fastening signal to the fastening tool through the tool controller; and receiving and storing the identification number of the vehicle body, the types of the fastening members, and the fastening torque result of the fastening tool from the tool controller.

14. The method of claim 13, wherein the identification number of the vehicle between the entry and exit sides of the conveyer line is obtained by the vehicle body sensing unit.

15. The method of claim 13, wherein when there are several fastening points for the vehicle body and the fastening object, a fastening pattern of the fastening tool at the fastening points is determined on the basis of the displacement of the fastening tool obtained by the inertia sensor module.

16. The method of claim 15, wherein the movement distance of the fastening tool is calculated by double integrating the acceleration of the fastening tool obtained by the inertia sensor module, and the movement path of the fastening tool is estimated by integrating the acceleration of the fastening tool obtained by the inertia sensor module.

17. The method of claim 13, wherein the identification number of the vehicle body, the types of the fastening members, and the fastening resultant value of the fastening tool are transmitted to a following repair process, and whether there is poor fastening of the fastening members at the fastening points is determined in the following repair process.

* * * * *